United States Patent
Kim et al.

(10) Patent No.: US 9,888,474 B2
(45) Date of Patent: **\*Feb. 6, 2018**

(54) METHOD AND DEVICE FOR ACTIVATING SECONDARY CARRIER IN WIRELESS COMMUNICATION SYSTEM FOR USING CARRIER AGGREGATION TECHNIQUE

(71) Applicant: Samsung Electronics Co., Ltd., Suwon-si, Gyeonggi-do (KR)

(72) Inventors: Soeng Hun Kim, Yongin-si (KR); Jae Hyuk Jang, Suwon-si (KR); Boon Loong Ng, Richardson, TX (US); Gert Jan Van Lieshout, Middlesex (GB); Sang Bum Kim, Seoul (KR); Kyeong In Jeong, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/149,431

(22) Filed: May 9, 2016

(65) Prior Publication Data

US 2016/0255634 A1    Sep. 1, 2016

Related U.S. Application Data

(63) Continuation of application No. 14/721,519, filed on May 26, 2015, now Pat. No. 9,337,967, which is a
(Continued)

(51) Int. Cl.
*H04W 24/00* (2009.01)
*H04W 72/04* (2009.01)
(Continued)

(52) U.S. Cl.
CPC ......... *H04W 72/0453* (2013.01); *H04J 11/00* (2013.01); *H04L 5/001* (2013.01);
(Continued)

(58) Field of Classification Search
None
See application file for complete search history.

(56) References Cited

U.S. PATENT DOCUMENTS

2008/0287068 A1    11/2008    Etemad
2009/0257387 A1    10/2009    Gholmieh et al.
(Continued)

FOREIGN PATENT DOCUMENTS

CN    101340711 A    1/2009
CN    101778416 A    7/2010
(Continued)

OTHER PUBLICATIONS

3GPP, '3rd Generation Partnership Project; Technical Specification Group Radio Access Network; Evolved Universal Terrestrial Radio Access (E-UTRA); Physical layer procedures (Release 9).' 3GPP TS 36.213 V9.3.0,Sep. 2010.
(Continued)

*Primary Examiner* — Edan Orgad
*Assistant Examiner* — Sithu Ko
(74) *Attorney, Agent, or Firm* — Jefferson IP Law, LLP

(57) ABSTRACT

The present invention proposes a method for activating secondary carriers in addition to the primary carrier in a wireless communication system supporting carrier aggregation technology. Through the present invention, the UE sorts the operations for activating an SCell into two groups that are executed at different timings, thereby facilitating communication without malfunctioning.

16 Claims, 8 Drawing Sheets

Related U.S. Application Data continuation of application No. 13/877,552, filed as application No. PCT/KR2011/008428 on Nov. 7, 2011, now Pat. No. 9,055,565.

(60) Provisional application No. 61/410,493, filed on Nov. 5, 2010, provisional application No. 61/431,635, filed on Jan. 11, 2011.

(51) Int. Cl.

| | |
|---|---|
| *H04L 5/00* | (2006.01) |
| *H04J 11/00* | (2006.01) |
| *H04W 72/08* | (2009.01) |
| *H04W 72/12* | (2009.01) |

(52) U.S. Cl.
CPC .............. *H04L 5/003* (2013.01); *H04L 5/005* (2013.01); *H04L 5/0048* (2013.01); *H04L 5/0053* (2013.01); *H04L 5/0057* (2013.01); *H04L 5/0098* (2013.01); *H04W 72/04* (2013.01); *H04W 72/042* (2013.01); *H04W 72/085* (2013.01); *H04W 72/1226* (2013.01)

(56) References Cited

U.S. PATENT DOCUMENTS

| | | | |
|---|---|---|---|
| 2010/0158147 | A1 | 6/2010 | Zhang et al. |
| 2010/0197339 | A1 | 8/2010 | Pedersen et al. |
| 2010/0202311 | A1 | 8/2010 | Lunttila et al. |
| 2010/0238863 | A1 | 9/2010 | Guo et al. |
| 2011/0116467 | A1 | 5/2011 | Jung et al. |
| 2011/0245142 | A1 | 10/2011 | Gizaw et al. |
| 2011/0249584 | A1* | 10/2011 | Barbieri ................ H04L 1/0026 370/252 |
| 2011/0292874 | A1 | 12/2011 | Ho et al. |
| 2012/0076023 | A1* | 3/2012 | Ko ........................ H04B 7/0486 370/252 |
| 2012/0093103 | A1 | 4/2012 | Lee et al. |
| 2012/0294167 | A1 | 11/2012 | Zhu et al. |
| 2013/0039202 | A1* | 2/2013 | Feuersanger ........... H04L 5/001 370/252 |
| 2013/0114579 | A1 | 5/2013 | Vujcic |
| 2013/0182674 | A1* | 7/2013 | Lunttila .................. H04L 5/001 370/329 |

FOREIGN PATENT DOCUMENTS

| | | |
|---|---|---|
| EP | 2230875 A2 | 9/2010 |
| JP | 2010-226720 A | 10/2010 |
| JP | 2013-524037 A | 6/2013 |
| JP | 2013-533673 A | 8/2013 |
| KR | 10-2010-0009493 A | 1/2010 |
| KR | 10-2010-0014118 A | 2/2010 |
| KR | 10-2010-0112524 A | 10/2010 |
| KR | 10-2010-0118067 A | 11/2010 |
| WO | 2010/051514 A1 | 5/2010 |
| WO | 2010/065759 A2 | 6/2010 |
| WO | 2010/087622 A2 | 8/2010 |
| WO | 2010/091425 A2 | 8/2010 |
| WO | 2010/107907 A2 | 9/2010 |
| WO | 2010/147956 A2 | 12/2010 |
| WO | 2011/063244 A2 | 5/2011 |
| WO | 2011/150361 A1 | 12/2011 |

OTHER PUBLICATIONS

LG Electronics Inc., PHR Format for CA, 3GPP TSG-RAN2 Meeting #70bis, Stockholm, Sweden, Jun. 28-Jul. 2, 2010, pp. 1-2, R2-103937.

Ericsson et al., Details of PHR Handling for CA, 3GPP TSG-RAN WG2 #70bis, Stockholm, Sweden, Jun. 28-Jul. 2 2010, pp. 1-3, Tdoc R2-103570.

ZTE, Parallel Transmission of Two Types PHR, 3GPP TSG RAN WG2 #70bis, Stockholm, Sweden, Jun. 28-Jul. 2, 2010, pp. 1-5, R2-103725.

Nokia Siemens Networks et al., Further Consideration on Virtual PHR, 3GPP TSG-RAN WG2 Meeting #71, Madrid, Spain, Aug. 23-27, 2010, R2-104394.

Mediatek, Further Details for Rel-10 PHR, 3GPP TSG-RAN WG2 Meeting #71bis, Xi'an, China, Oct. 11-15, 2010, R2-105444.

Alcatel-Lucent, Corrections on PHR/Pcmax,c and Activation/Deactivation, 3GPP TSG-RAN WG2 Meeting #72bis, Dublin, Ireland, Jan. 17-21, 2011, R2-110140.

Samsung, Discussion on SCell Activation/Deactivation and CQI Reporting, 3GPP TSG-RAN2 #72bis Meeting, Dublin, Ireland, Jan. 17-21, 2011, pp. 1-4, R2-110149.

LG Electronics; "Aspect on Simultaneous Transmission of PRACH and UL Channels considering Multiple Timing Advance[online]"; Nov. 14-18, 2011; pp. 2-5; 3GPP TSG-RAN WG1#67, R1-113910; 3GPP; San Francisco, CA, USA.

Panasonic; "UE-specific Power headroom report"; Jul. 28-30, 2010; pp. 1-3; 3GPP TSG-RAN WG2 Meeting #70 bis R2-103602; Stockholm Sweden.

Catt; "Definition of Pcmax in CA"; Nov. 15-19, 2010; pp. 1-4; 3GPP TSG-RAN WG4 Meeting #57, R4-104357; Jacksonville, FL. USA.

Qualcomm Inc.; "Definition of Pcmax,c,"; Oct. 11-15, 2010; pp. 1-4; 3GPP TSG-RAN WG1 #63, R1-106348; Xian, China.

3rd Generation Partnership Project; "LS on the reference format on virtual PHR"; Oct. 11-15, 2010; 3GPP TSG-RAN WG1#62b R1-105820; Xian, China.

Research in Motion et al: "Discussion on Per UE PHR", Aug. 23-27, 2010; 3GPP Draft; R1-104917 (RIM-PERUEPHR),3rd Generation Partnership Project(3GPP), Madrid, Spain; XP050450063.

Potevio; "Remaining Issues on PHR for CA", May 10-14, 2010; 3GPP Draft; R2-102770; XP050422890; Montreal; Canada.

ZTE: "Parallel transmission of two types PHR", pp. 1-6, Jun. 28-Jul. 2, 2010; 3GPP Draft; R2-103725 Parallel Transmission OT Type 1, 2 PHR, 3rd Generation Partnership Project(3GPP), XP050451200; Stockholm, Sweden.

Nokia Siemens Networks et al: "Further consideration on virtual PHR", Aug. 23-27, 2010; 3GPP Draft; R2-104394, Further Consideration on VirtualPHR, 3rd Generation Partnership Project (3GPP), XP050451845; Madrid, Spain.

Ericsson: "Summary of e-mail discussion [71#57] LTE CA: PHR Reporting", Oct. 11-15, 2010; pp. 1-16; 3GPP Draft; R2-105462—Summary of E-Mail Discussion 71#57—PHR Reporting, 3rd Generation Partnership Project (3GPP), XP050605439; Xian, China.

Alcatel-Lucent et al: "Discussion on PHR remaining issues", Oct. 11-15, 2010; pp. 1-4; 3GPP Draft; R2-105648, 3rd Generation Partnership Project (3GPP), XP050452546; Xian, China.

ITRI: "Considerations on the remaining issues of PHR", Aug. 23-27, 2010; 3GPP Draft; R2-104893, Considerations on the Remaining Issues of PHR V2, 3rd Generation Partnership Project (3GPP), XP050452011; Madrid, Spain.

Mediatek; "Further details for Rel-10 PHR"; pp. 1-3; Oct. 11-15, 2010; 3GPP TSG-RAN WG2 Meeting #71bis, R2-105444; Xian, China.

Nokia Siemens Networks et al: "Timing and HARQ Feedback Errors with Activation/Deactivation", 3GPP Draft; R2-101986 MAC Activation Deactivation, 3rd Generation Partnership Project(3GPP), XP050422521.

Etsi: "Evolved Universal Terrestrial Radio Access (E-UTRA); Medium Access Control (MAC) protocol specification", 3GPP TS36.321 V9.3.0, XP055121209.

Huawei et al: "Triggering and transmission of aperiodic CSI reports", 3GPP Draft; R1-105128, 3rd Generation Partnership Project(3GPP), XP050450349.

Ericsson(RAN2): "LS on Timing Requirements for Activation and Deactivation of SCells", 3GPP Draft; R2-105961 LS on Timing Requirements for Activation and Deactivation of Scells, 3rd Generation Partnership Project (3GPP), XP050605479.

Alcatel-Lucent Shanghai Bell et al: Specification Considerations on Restricted CSI Measurement, 3GPP Draft; R1-106000 Specification Considerations Related to ABS on Restricted CSI Measurement_

(56) References Cited

OTHER PUBLICATIONS

Final, 3rd Generation Partnership Project (3GPP), Mobile Competence Centre; 650, Route Des Lucioles; F-06921 Sophia-Antipolis Cedex; France, vol. RAN WG1, No. Jacksonville, USA; Nov. 15, 2010, Nov. 9, 2010 (Nov. 9, 2010), XP050489503.

RAN2, LS on Timing Requirements for Activation and Deactivation of SCells, 3GPP TSG RAN WG1 Meeting #63, R1-105829 (R2-106016), XP050466685, Nov. 9, 2010, Jacksonville, USA.

Alcatel-Lucent et al, Implementation of timing Requirements for Activation and Deactivation of SCells in RAN1 specification, 3GPP TSG RAN WG1 Meeting #63, R1-106218_FINAL, XP050489658, Nov. 9, 2010, Jacksonville, USA.

Samsung, SCell activation and CQI reporting, 3GPP TSG-RAN2#72 meeting, R2-106507, XP050492306, Nov. 9, 2010, Jacksonville, USA.

New Postcom, Discussion of PHR open issues, 3GPP TSG-RAN2 #71bis, R2-105410, Jul. 23, 2010, Xi'an, China.

Zte, PHR remain issue, 3GPP TSG-RAN WG2 #71, Tdoc R2-104629, Jul. 23, 2010, Madrid, Spain.

\* cited by examiner

METHOD AND DEVICE FOR ACTIVATING SECONDARY CARRIER IN WIRELESS COMMUNICATION SYSTEM FOR USING CARRIER AGGREGATION TECHNIQUE

CROSS-REFERENCE TO RELATED APPLICATION(S)

This application is a continuation application of prior application Ser. No. 14/721,519, filed on May 26, 2015 and of prior application Ser. No. 13/877,552, filed on Apr. 3, 2013, which has issued as U.S. Pat. No. 9,055,565 on Jun. 9, 2015 and which claimed the benefit under 35 U.S.C. § 371 of an International application filed on Nov. 7, 2011 and assigned application number PCT/KR2011/008428, which claimed the benefit of a U.S. provisional patent application filed on Nov. 5, 2010 in the United States Patent and Trademark Office and assigned Ser. No. 61/410,493, and of a U.S. provisional patent application filed on Jan. 11, 2011 in the United States Patent and Trademark Office and assigned Ser. No. 61/431,635, the entire disclosure of each of which is hereby incorporated by reference.

BACKGROUND OF THE INVENTION

Field of the Invention

The present invention relates to a wireless communication system and, in particular, to a method for activating a secondary carrier in addition to the primary carrier in a Long Term Evolution (LTE) system supporting Carrier Aggregation.

Description of the Related Art

With the rapid advance of wireless communication technology, the communication system has evolved to the 4th Generation mobile communication systems such as Long Term Evolution (LTE) system. The LTE system adopts various techniques to meet the increased traffic requirements and, Carrier Aggregation is one of these techniques. The carrier aggregation is a technique capable of increasing the data rate in proportion to the number of aggregated carriers including plural secondary carrier as well as the primary carrier between a User Equipment (UE) and an evolved Node B (eNB) as compared to the conventional system using a single carrier. In LTE, the primary cell is referred to as PCell and the secondary cell is referred to as SCell.

In order to use the carrier aggregation technique, it is inevitable that the complexity increases to control the PCell and the SCells. That is, there is a need of control to determine the SCell(s) to be configured for use along the PCell and to be activated for actual use.

There is therefore a need of a detailed procedure for activating an SCell. That is, it is necessary to specify the operation of the UE when an S Cell activation command is received from the eNB.

DISCLOSURE OF INVENTION

Technical Problem

The present invention has been made in an effort to solve the above problem, and it is an object of the present invention to provide a method for activating secondary carriers in the mobile communication system supporting carrier aggregation.

Solution to Problem

In the present invention, the operations for performing secondary carrier (SCell) activation are sorted into two groups that are executed at different timings.

In order to accomplish this, a secondary carrier activation method of a terminal in a wireless communication system supporting carrier aggregation includes receiving secondary carrier aggregation activation information instructing activation of secondary carriers configured to the terminal; checking a first timing in configuring the activation of the secondary carriers and performing first operations at the first timing; and checking a second timing and performing second operations before the second timing.

A terminal for activating secondary carriers under the control of a base station in a wireless communication system supporting carrier aggregation includes a transceiver which transmits and receives control signals or data to and from the base station; and a controller which controls receiving secondary carrier aggregation activation information instructing activation of secondary carriers configured to the terminal from the base station, checking a first timing in configuring the activation of the secondary carriers and performing first operations at the first timing, and checking a second timing and performing second operations before the second timing.

Advantageous Effects

With the proposed method, it is possible to execute all the operations for activating cells such that the UE is capable of performing the secondary carrier activation without error.

DETAILED DESCRIPTION OF EXEMPLARY EMBODIMENTS

In the following, detailed description of well-known functions and structures incorporated herein may be omitted to avoid obscuring the subject matter of the present invention. Exemplary embodiments of the present invention are described with reference to the accompanying drawings in detail.

The present invention relates to a secondary carrier activation method and apparatus of a UE capable of carrier aggregation.

Figure 1:
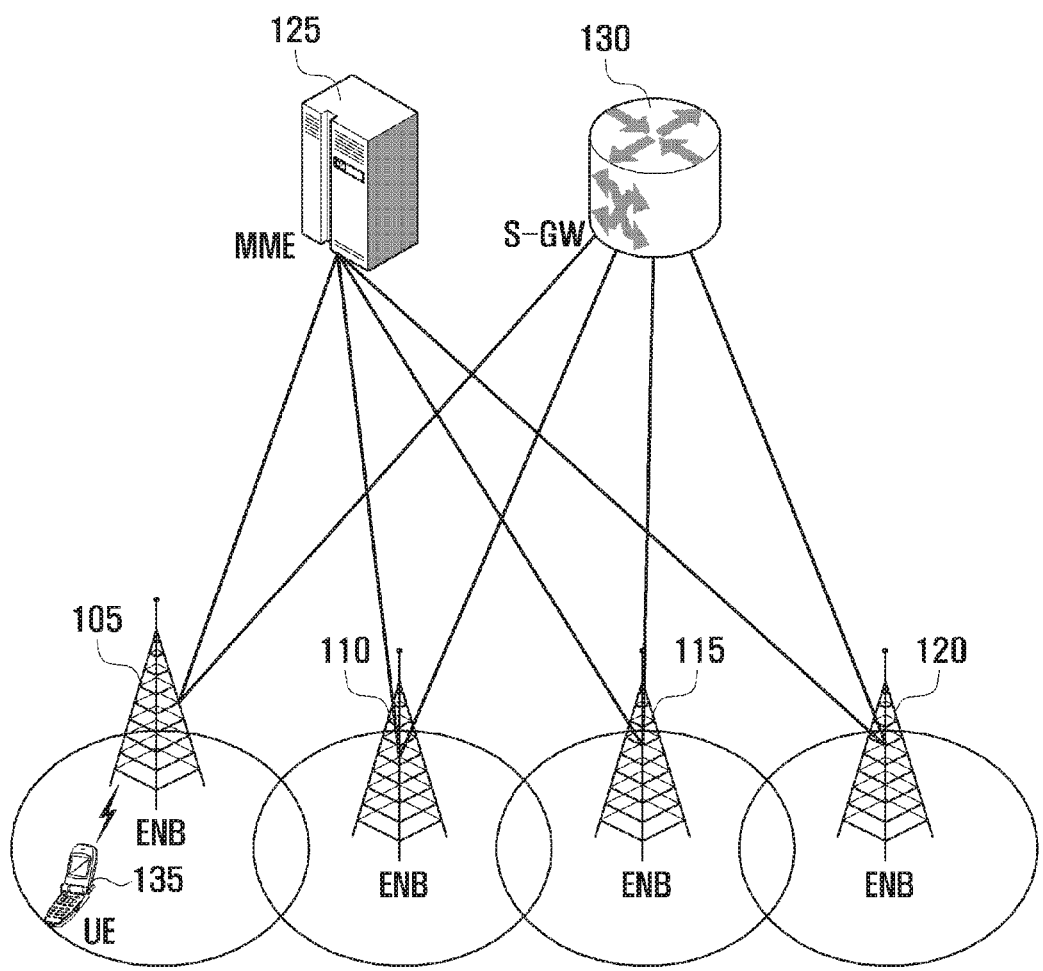
FIG. 1 is a diagram illustrating the architecture of an LTE system to which the present invention is applied.

FIG. 1 is a diagram illustrating the architecture of an LTE system to which the present invention is applied.

Referring to FIG. 1, the radio access network of the mobile communication system includes evolved Node Bs (eNBs) 105, 110, 115, and 120, a Mobility Management Entity (MME) 125, and a Serving-Gateway (S-GW) 130. The User Equipment (hereinafter, referred to as UE) 135 connects to an external network via eNBs 105, 110, 115, and 120 and the S-GW 130.

In FIG. 1, the eNBs 105, 110, 115, and 120 correspond to legacy node Bs of Universal Mobile Communications System (UMTS). The eNBs 105, 110, 115, and 120 allow the UE to establish a radio link and are responsible for complicated functions as compared to the legacy node B. In the LTE system, all the user traffic including real time services such as Voice over Internet Protocol (VoIP) are provided through a shared channel and thus there is a need of a device which is located in the eNB to schedule data based on the state information such as UE buffer conditions, power headroom state, and channel state. Typically, one eNB controls a plurality of cells. In order to secure the data rate of up to 100 Mbps, the LTE system adopts Orthogonal Frequency Division Multiplexing (OFDM) as a radio access technology. Also, the LTE system adopts Adaptive Modulation and Coding (AMC) to determine the modulation scheme and channel coding rate in adaptation to the channel condition of the UE. The S-GW 130 is an entity to provide data bearers so as to establish and release data bearers under the control of the MME 125. MME 125 is responsible for various control functions and connected to a plurality of eNBs 105, 110, 115, and 120.

Figure 2:
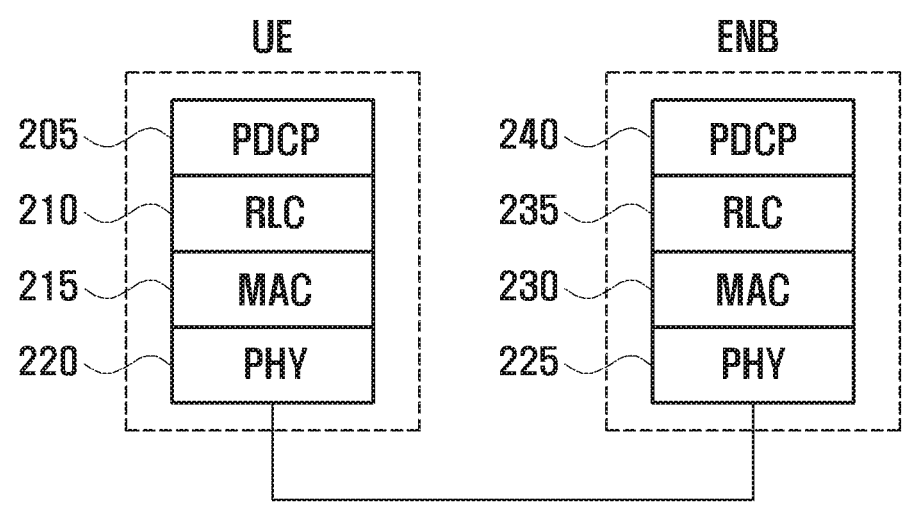
FIG. 2 is a diagram illustrating a protocol stack of the LTE system to which the present invention is applied.

FIG. 2 is a diagram illustrating a protocol stack of the LTE system to which the present invention is applied.

Referring to FIG. 2, the protocol stack of the LTE system includes Packet Data Convergence Protocol (PDCP) 205 and 240, Radio Link Control (RLC) 210 and 235, Medium Access Control (MAC) 215 and 230, and Physical (PHY) 220 and 225. The PDCP 205 and 240 is responsible for IP header compression/decompression, and the RLC 210 and 235 is responsible for segmenting the PDCP Protocol Data Unit (PDU) into segments in appropriate size for Automatic Repeat Request (ARQ) operation. ARQ is the technique for checking whether the packet transmitted by the transmitted is received by the received successfully and retransmitting the packets received erroneously. The MAC 215 and 230 is responsible for establishing connection to a plurality of RLC entities so as to multiplex the RLC PDUs into MAC PDUs and demultiplex the MAC PDUs into RLC PDUs. The PHY 220 and 225 performs channel coding on the MAC PDU and modulates the MAC PDU into OFDM symbols to transmit over radio channel or performs demodulating and channel-decoding on the received OFDM symbols and delivers the decoded data to the higher layer.

Figure 3:
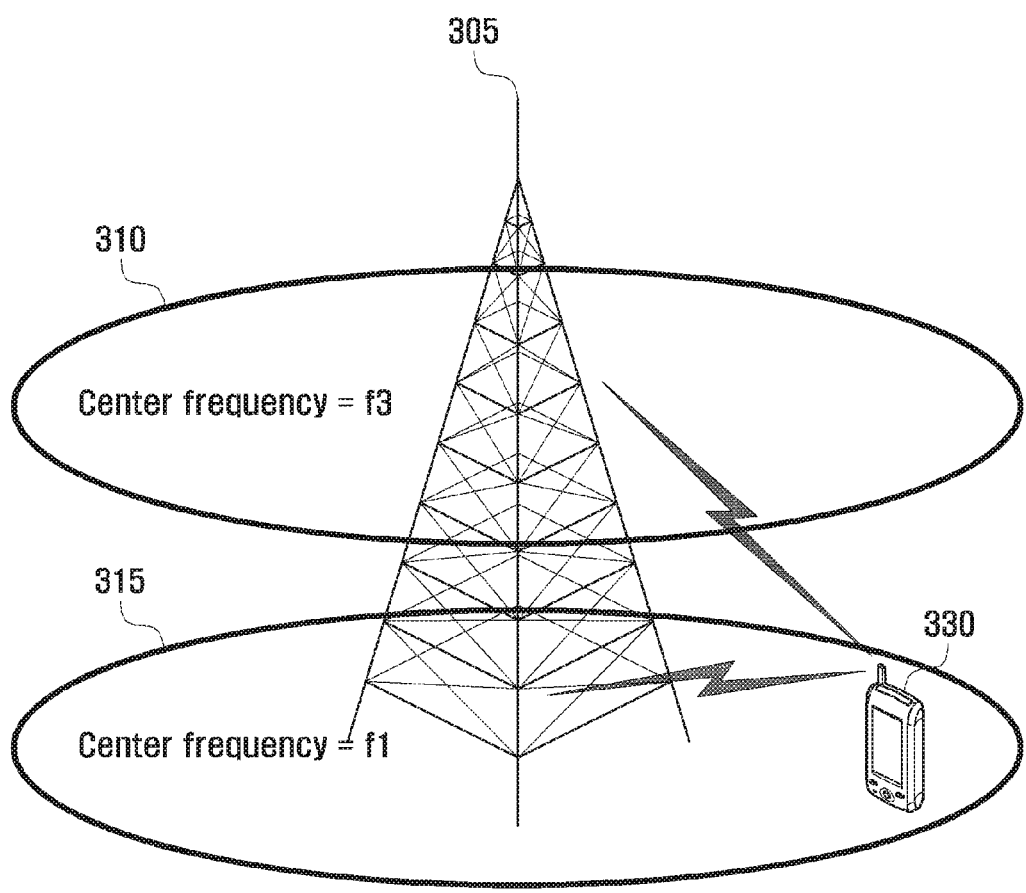
FIG. 3 is a diagram illustrating an exemplary situation of carrier aggregation in the LTE system to which the present invention is applied.

FIG. 3 is a diagram illustrating an exemplary situation of carrier aggregation in the LTE system to which the present invention is applied.

Referring to FIG. 3, typically an eNB can use multiple carriers transmitted and receive in different frequency bands. For example, the eNB 305 can be configured to use the carrier 315 with center frequency f1 and the carrier 310 with center frequency f3. If carrier aggregation is not supported, the UE 330 has to transmit/receive data unit one of the carriers 310 and 315. However, the UE 330 having the carrier aggregation capability can transmit/receive data using both the carriers 310 and 315. The eNB can increase the amount of the resource to be allocated to the UE capable of carrier aggregation in adaptation to the channel condition of the UE so as to improve the data rate of the UE.

In case that a cell is configured with one downlink carrier and one uplink carrier as a conventional concept, the carrier aggregation can be understood as if the UE communicates data via multiple cells. With the use of carrier aggregation, the maximum data rate increases in proportion to the number of aggregated carriers.

In the following description, the phrase "the UE receives data through a certain downlink carrier or transmits data through a certain uplink carrier" means to transmit or receive data through control and data channels provided in a cell corresponding to center frequencies and frequency bands of the downlink and uplink carriers. Although the description is directed to an LTE mobile communication system for explanation convenience, the present invention can be applied to other types of wireless communication systems supporting carrier aggregation.

An embodiment of the present invention proposes a UE operation when a secondary carrier (SCell) activation command is received from the eNB. In an embodiment of the present invention, the UE operations upon receipt the secondary carrier activation command are sorted into two sets which are applied at different timings. This is because if the operations requiring different operation time durations are executed at the same timing determined based on the operation requiring longer time duration this increases the activation delay.

For example, the UE cannot use the secondary carrier (SCell) for data transmission upon receipt of the command from the eNB. This is because it takes addition time to activate devices for use of the secondary carrier (SCell). Furthermore, once the devices have been activated, there may be other operations requiring more time.

Figure 4:
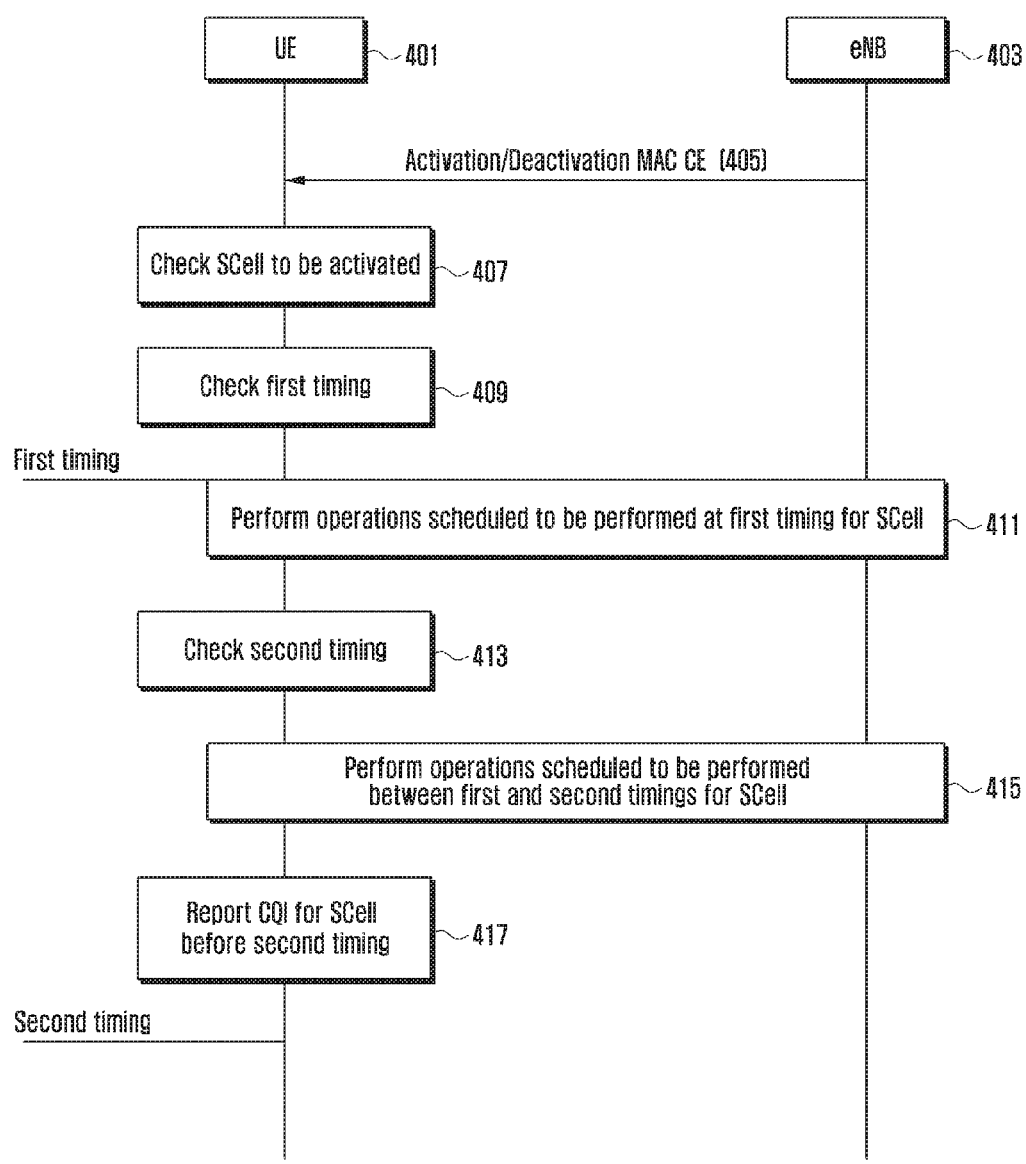
FIG. 4 is a signaling diagram illustrating message flows between the eNB and the UE in the secondary carrier activation method according to an embodiment of the present invention.

FIG. 4 is a signaling diagram illustrating message flows between the eNB and the UE in the secondary carrier activation method according to an embodiment of the present invention.

The eNB 403 determines the SCells to be activated or deactivated among the SCells configured to the UE 401. The eNB generates a SCell activation information (or Activation/Deactivation MAC Control Element (CE) including an indicator indicating activation or deactivation of the SCell and sends the UE 401 the Activation/Deactivation MAC CE at Nth subframe at step 405. The Activation/Deactivation MAC CE is 8-bit fixed size MAC CE including 7 C fields and one R field. Here, R denotes a reserved field, and 7 C fields are expressed as C7, C6, C5, C4, C3, C2, and C1 (i.e. Ci). If Ci corresponding to SCell i is set to 1, this indicates activation and, otherwise if Ci is set to 0, this indicates deactivation.

If the Activation/Deactivation MAC CE is received, the UE checks the SCells to be activated or deactivated at step 407 and checks the first timing at step 409. The first timing is (N+m)th subframe where m is a integer equal to or greater than 1 (e.g. 8). The first timing is of performing the operations that can be executed immediately among the UE's SCell activation operations. The parameter m is preferably set to a value large enough by taking notice of the UE having low processing capability in consideration of the time necessary for the UE to receive and decode the Activation/Deactivation MAC CE and recognize the meaning At the first timing of (N+m)th subframe, the UE 401 performs the predetermined first operations at step 411. The first operations are as follows.

scheduling channel monitoring
CQI measurement
PUSCH transmission/PDSCH reception
CQI reporting
SRS transmission Afterward, the UE 401 checks the second timing at step 413. The second timing (N+z+4)th subframe where z is an integer equal to or greater than m, (N+z)th subframe is the downlink subframe available for channel quality (Channel Quality Information (CQI) or Channel Status Information (CSI)) measurement which arrives first, and 4 is a constant value given for measurement before 4 subframes. That is, the CQI measurement is performed at (N+z)th subframe, and the measured CQI is reported at the (N+z+4)th subframe or later. The valid downlink subframe is defined as the time fulfilling the following conditions:

DL subframe is configured for corresponding UE,
transmission mode 9 is ruled out and no MBSFN subframe,
not include DwPTS field when the length of DwPTS is equal to or less than 7680*TS
the subframe is not positioned in measurement gap for the UE
For periodic CSI report, CSI subframe set is configured to the UE, component of CSI subframe associated with periodic CSI report.

After checking the second timing, the UE 401 performs the predetermined second operations before the second timing. Here, the predetermined second operations include the operations related to CQI report as follows.

If valid CQI measurement is performed, report CQI actually.
At the CQI reporting timing, the UE reports a CQI index value selected in the range from 1 to 15 by referencing table 1 according to the actual measurement.

TABLE 1

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 | if there is no valid CQI, report CQI set to 0 (refer to table 1).

Next, the UE reports the CQI before the second timing at step 417 such that all the operations are performed correctly since the second timing.

Figure 5:
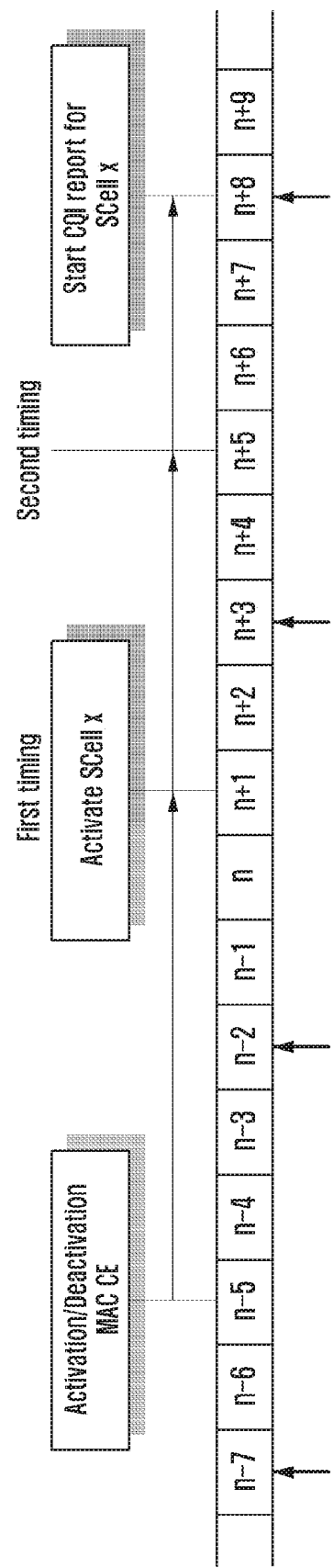
FIG. 5 is a diagram illustrating operation timings in unit of subframe for secondary carrier activation method according to an embodiment of the present invention.

FIG. 5 is a diagram illustrating operation timings in unit of subframe for secondary carrier activation method according to an embodiment of the present invention.

In FIG. 5, the CQI report resource for SCell is allocated at an interval of 5 ms (a subframe has a length of 1 ms) and indicated by arrows (at [n−7], [n−2], [n+3], [n+8], . . . ).

First, the UE receives the Activation/Deactivation MAC CE at (n−5)th subframe. At this time, the UE interprets the MAC CE to determine the SCells to be activated or deactivated for a certain time. Assuming that it takes 6 msec for activation/deactivation of the synchronized SCells, the value m is 6 at the first timing in FIG. 4. At [n+1] of FIG. 5, the UE performs the first operations scheduled to be performed at the first timing, and this is identical with the description of step 411 of FIG. 4.

Here, the first timing is the last time point when the operations scheduled to be performed at the first timing are initiated, and if the UE is capable of interpreting the MAC CE as soon as possible, the operations can be performed in advance. In this case, the next CQI report can be performed with the average of more values so as to report more accurate value.

Afterward, the UE calculates the second timing of FIG. 4 (after 4 subframes in FIG. 5) and starts the second operations scheduled to be performed at the second timing. The CQI report is performed as described with reference to FIG. 4, and the UE starts CQI report for the SCell based on the second timing. That is, although the resource for CQI report is allocated at [n−7], [n−2], and [n+3] timings in FIG. 5, the CQI report is not performed at these timings but at [n+8] timing as the first resource allocated since the subframe [n+5]. Here, comparing the [n+5] timing of FIG. 5 to (N+z+4) defined as the second timing in FIG. 4, z equal to m, i.e. 6. If the UE has the capability of reporting CQI before the second timing, it is possible to report the CQI before the second timing.

Figure 6:
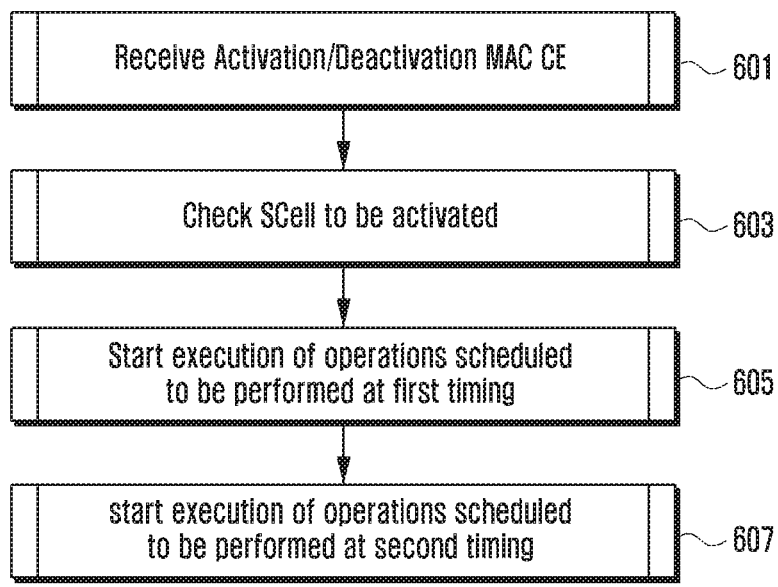
FIG. 6 is a flowchart illustrating the UE procedure of the SCell activation method according to an embodiment of the present invention.

FIG. 6 is a flowchart illustrating the UE procedure of the S Cell activation method according to an embodiment of the present invention.

First, the UE receives the Activation/Deactivation MAC CE including an 8-bit bitmap at the Nth subframe at step 601. Each bit of the bitmap carried in the MAC CE indicates whether to activate/deactivate the corresponding SCell.

If the Activation/Deactivation MAC CE is received, the UE determines whether there is any SCell to be newly activated and, if so, checks the SCell to be activated at step 603. In more detail, the UE checks the deactivated SCells before the receipt of the MAC CE and, when the MAC CE is received, determines whether any of the deactivated SCells is indicated to be indicated to be activated by the corresponding bit of the bitmap in the MAC CE.

If any SCell to be activated newly is checked, the UE checks the first timing and performs the operations scheduled to be performed at the first timing at step 605. The first timing corresponds to (N+m)th subframe, i.e. the subframe arriving after m subframes since the receipt of the Activation/Deactivation MAC CE at Nth subframe. The UE performs the first operation scheduled to be performed at the first timing based on the (N+m)th subframe. As described with reference to FIG. 4, these operations include at least one of the following operations that have been described with reference to FIG. 4.

scheduling channel monitoring
CQI measurement
PUS CH transmission/PDS CH reception
CQI reporting
SRS transmission Also, m is the fixed value known to all UEs and eNBs (e.g. m=8).

Afterward, the UE checks the second timing and performs the second operations scheduled to be performed at the second timing at step 607. The second timing is the (N+z+4)th subframe equal to the second timing of FIG. 4, and z is an integer value equal to or greater than m. The second operations scheduled to be performed at the second timing includes CQI report as described with reference to FIG. 4. In more detail, the UE reports the CQI for the activated SCell through the allocated CQI report resource arriving first since the second timing. The UE also reports the CQI for the S Cell continuously through the CQI report resource allocated for the activated SCell. Although the CQI report is not transmitted between the first and second timings, if the valid CQI measurement result becomes available before the arrival of the second timing, it is possible to perform CQI report for the SCell. If there is no valid CQI measurement result between the first and second timings, the UE reports a predetermined value (e.g. CQI=0). However, if valid CQI measurement result is achieved before the second timing, the UE stops reporting the predetermined value and reports the report value reflecting the actual CQI measurement result to the eNB.

Figure 7:
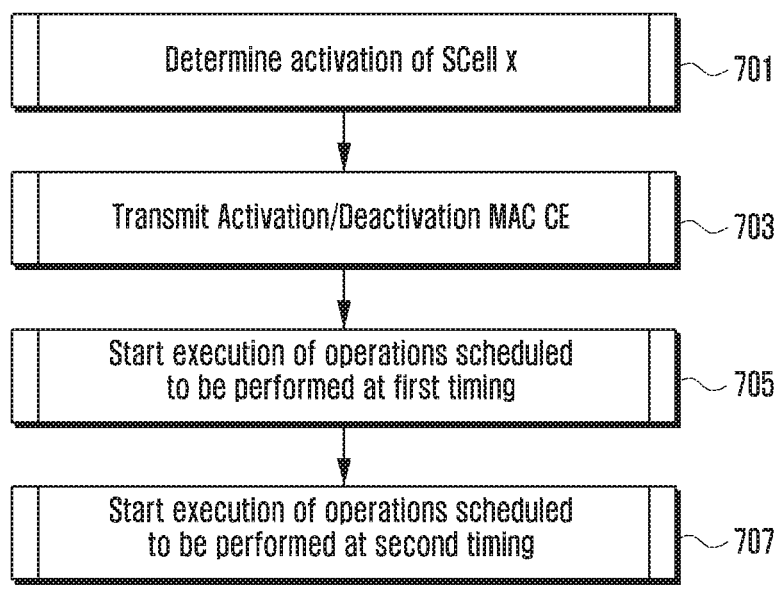
FIG. 7 is a flowchart illustrating the eNB procedure of the SCell activation method according to an embodiment of the present invention.

FIG. 7 is a flowchart illustrating the eNB procedure of the S Cell activation method according to an embodiment of the present invention.

The eNB determines whether to activate SCell x of the UE at step 701. This may be the case when the traffic load of the cell increases due to the increase of the number of UEs served by the eNB.

Afterward, the eNB generates and transmits Activation/Deactivation MAC CE message for activating the SCell x at step 703.

Afterward, the eNB performs the first operations scheduled to be performed at the first timing at step 405. The first operations include allocating resource to the UE in the SCell x and receiving signals such as SRS message.

Finally, the eNB performs the operations scheduled to be performed at the second timing at step 407. These operations include receiving the CQI report at the subframe designated to carry the CQI report of the SCell.

Figure 8:
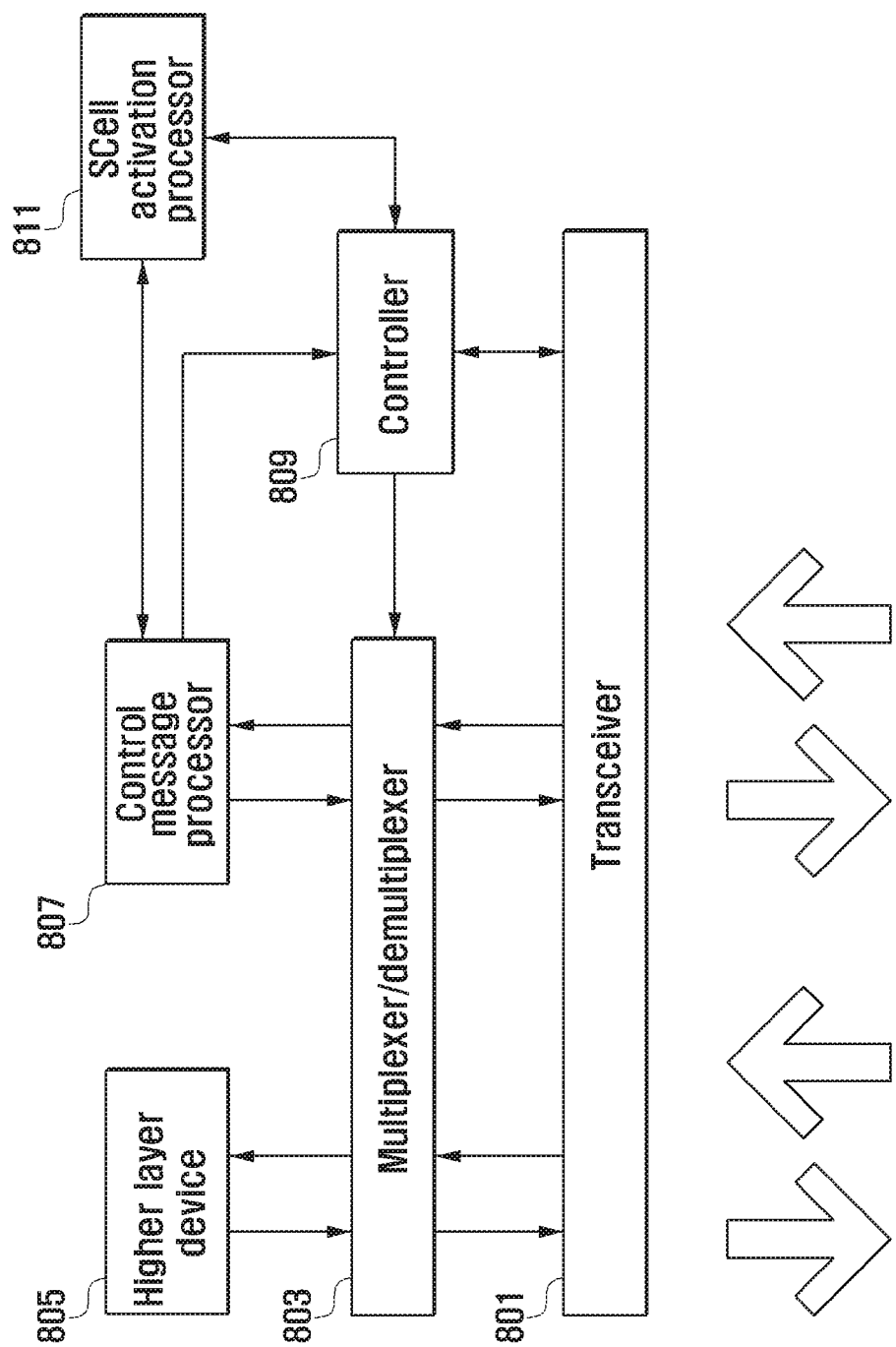
FIG. 8 is a block diagram illustrating the configuration of the UE according to an embodiment of the present invention.

FIG. 8 is a block diagram illustrating the configuration of the UE according to an embodiment of the present invention.

The UE communicates data with higher layer processor 805 and transmits/receives control messages via the control message processor 807. When transmitting control signal or data to the eNB, the UE multiplexes the control signals or data by means of the multiplexer/demultiplexer 803 and transmits the multiplexed signals to by means of the transceiver 801 under the control of the controller 809. The UE also receives the physical signal by means of the transceiver 801, demultiplexes the received signal by means of the multiplexer/demultiplexer 803, and delivers the demultiplexed information to the higher layer processor 805 or control message processor 807 under the control of the controller 809.

In an embodiment of the present invention, if the Activation/Deactivation MAC CE is received, the control message processor 807 notifies the SCell activation processor 811 of the receipt of the Activation/Deactivation MAC CE. The S Cell deactivation processor 811 checks the first timing and instructs the controller 809 and the control message processor 807 to perform the first operations at the first timing or even before the arrival of the first timing. Afterward, the SCell activation processor 811 checks the second timing and performs the second operations at the second timing or even before the arrival of the second timing. The second operations include reporting CQI for the second cell, and the CQI report for the SCell is performed using the CQI report resource allocated for the SCell.

Although FIG. 8 is directed to the case where the UE is configured with plural function blocks in charge of different roles, the present invention is no limited thereto. For example, the functions of the SCell activation processor 811 can be performed by the controller 809.

As described above, the SCell activation method of the present invention is capable of facilitating execution of the operations scheduled to be performed at predetermined timings in activating an SCell, resulting in improvement operation reliability.

Although exemplary embodiments of the present invention have been described in detail hereinabove with specific terminology, this is for the purpose of describing particular embodiments only and not intended to be limiting of the invention. While particular embodiments of the present invention have been illustrated and described, it would be obvious to those skilled in the art that various other changes and modifications can be made without departing from the spirit and scope of the invention.

What is claimed is:

1. A method by a terminal, the method comprising:
receiving a control message for activating a secondary cell from a base station in a first sub-frame;
transmitting first channel status information (CSI) of the secondary cell in a second sub-frame; and
transmitting sounding reference signal (SRS) for the secondary cell no earlier than 8 sub-frames after the first sub-frame,
wherein, if the first CSI of the secondary cell is invalid, the first CSI of the secondary cell is set to 0, and
wherein if the first CSI of the secondary cell is valid, the valid first CSI of the secondary cell is selected from 1 to 15 based on actual measurement of the secondary cell.

2. The method of claim 1, further comprising:
monitoring a downlink control channel for the secondary cell no earlier than the second sub-frame.

3. The method of claim 1, wherein the CSI includes channel quality indicator (CQI).

4. The method of claim 1, further comprising:
transmitting second CSI for the secondary cell no later than a third sub-frame.

5. The method of claim 1, wherein the second subframe occurs 8 sub-frames after the first sub-frame.

6. The method of claim 1, wherein the first CSI is transmitted although the first CSI of the secondary cell is invalid.

7. The method of claim 4, wherein a valid CSI of the secondary cell is transmitted no later than the third sub-frame.

8. The method of claim 4, wherein if the second CSI of the secondary cell is invalid, the second CSI of the secondary cell is set to 0.

9. A terminal comprising:
a transceiver configured to transmit and receive a signal; and
at least one processor configured to:
receive a control message for activating a secondary cell from a base station in a first sub-frame,
transmit first channel status information (CSI) of the secondary cell in a second sub-frame, and
transmit sounding reference signal (SRS) for the secondary cell no earlier than 8 sub-frames after the first sub-frame,
wherein, if the first CSI of the secondary cell is invalid, the first CSI of the secondary cell is set to 0, and
wherein if the first CSI of the secondary cell is valid, the valid first CSI of the secondary cell is selected from 1 to 15 based on actual measurement of the secondary cell.

10. The terminal of claim 9, wherein the at least one processor is further configured to monitor a downlink control channel for the secondary cell no earlier than the second sub-frame.

11. The terminal of claim 9, wherein the CSI includes channel quality indicator (CQI).

12. The terminal of claim 9, wherein the at least one processor is further configured to transmit second CSI for the secondary cell no later than a third sub-frame.

13. The terminal of claim 9, wherein the second subframe occurs 8 sub-frames after the first sub-frame.

14. The terminal of claim 9, wherein the first CSI is transmitted although the first CSI of the secondary cell is invalid.

15. The terminal of claim 12, wherein a valid CSI of the secondary cell is transmitted no later than the third sub-frame.

16. The terminal of claim 12, wherein if the second CSI of the secondary cell is invalid, the second CSI of the secondary cell is set to 0.

* * * * *